United States Patent
Wang et al.

(10) Patent No.: US 9,298,713 B2
(45) Date of Patent: Mar. 29, 2016

(54) EXECUTOR FOR SOFTWARE CONFIGURATION AUTOMATION

(75) Inventors: Yaqing Wang, Palo Alto, CA (US);
Shengming Yu, San Ramon, CA (US);
Santosh Poonen, Berthoud, CO (US)

(73) Assignee: Oracle International Corporation, Redwood Shores, CA (US)

( * ) Notice: Subject to any disclaimer, the term of this patent is extended or adjusted under 35 U.S.C. 154(b) by 757 days.

(21) Appl. No.: 13/481,486

(22) Filed: May 25, 2012

(65) Prior Publication Data
US 2013/0086130 A1 Apr. 4, 2013

Related U.S. Application Data (60) Provisional application No. 61/541,587, filed on Sep. 30, 2011.

(51) Int. Cl.
*G06F 17/30* (2006.01)
*G06F 9/445* (2006.01)

(52) U.S. Cl.
CPC ............ *G06F 17/30067* (2013.01); *G06F 8/60* (2013.01); *G06F 17/30286* (2013.01)

(58) Field of Classification Search
CPC .............. G06F 8/60; G06F 17/30067; G06F 17/30286; G06F 17/30595; H04L 49/205; H04L 49/351; H04L 49/354; H04L 49/602
USPC ............ 707/802, 812; 709/220; 370/392, 400
See application file for complete search history.

(56) References Cited

U.S. PATENT DOCUMENTS

| | | | | |
|---|---|---|---|---|
| 5,119,291 A * | 6/1992 | Flannagan et al. | ................ | 711/4 |
| 6,199,076 B1 * | 3/2001 | Logan et al. | ................. | 715/203 |
| 6,549,932 B1 * | 4/2003 | McNally | ............... | G06F 9/4862 709/202 |
| 6,553,403 B1 * | 4/2003 | Jarriel | .................. | H04L 41/048 709/202 |
| 6,671,724 B1 * | 12/2003 | Pandya | ............... | H04L 67/1023 370/236 |
| 7,035,930 B2 * | 4/2006 | Graupner | .............. | G06F 9/5088 709/221 |
| 7,185,075 B1 * | 2/2007 | Mishra | .................... | H04L 12/24 379/207.01 |
| 7,363,359 B1 * | 4/2008 | Tripathy | ................. | H04L 41/20 370/350 |
| 8,042,112 B1 * | 10/2011 | Zhu et al. | ...................... | 707/706 |
| 2006/0130154 A1 * | 6/2006 | Lam et al. | ....................... | 726/30 |
| 2007/0121863 A1 * | 5/2007 | Nagel et al. | ................... | 379/161 |
| 2012/0215891 A1 * | 8/2012 | Lessmann et al. | ............ | 709/220 |

\* cited by examiner

*Primary Examiner* — Shahid Alam
(74) *Attorney, Agent, or Firm* — Marger Johnson (57) ABSTRACT

A distributed topology system may include a distributed topology engine configured to run on a server device and define a topology consisting of one or more building blocks. Each building block may represent one or more tasks pertaining to an application. The system may also include a distributed topology application configured to run on a client device and automatically execute one or more of the building blocks. A distributed topology database may be used to store the topology.

26 Claims, 11 Drawing Sheets

Select Import Parameter [   ] [v]

Select Block [v]

Select Block Export Param. [v]

| Show all Export Parameters | Reset above selection | Select | |
|---|---|---|---|
| Import Parameter | Value | | Description |
| PLATFORM | %PLATFORM% | | The value should be %PL |
| HOSTAME | %HOST% | | The name of the host on |
| SHIPHOME | %SHIPHOME_RDBMS_11.2.0.1.0% | | The shiphome location for |
| ORACLE_HOME | %OH% | | The ORACLE_HOME locat |
| ORACLE_HOME_NAME | %OHN% | | The ORACLE_HOME_NA |
| INVENTORY_LOC | %INVLOC% | | The inventory location us |
| ORACLE_SID | %SID% | | The Database SID for this |
| GLOBAL_DB_NAME | %GDBNAME% | | The Global Dtabase Nam |
| INSTALL_TYPE | EE | | Valid install types are : EE |
| DB_CHARSET | AL32UTF8 | | The database charaters |
| DB_PORT | %DB_PORT% | | The database listener po |
| SYS_PASSWORD | welcome1 | | The common password to |
| SOFTWARE_ONLY | true | | Whether the install lays o |

EXECUTOR FOR SOFTWARE CONFIGURATION AUTOMATION

CROSS-REFERENCE TO RELATED APPLICATION

This patent application is related to and claims the benefit of U.S. Provisional Patent Application No. 61/541,587, titled "DISTRIBUTED TOPOLOGY ENVIRONMENT" and filed on Sep. 30, 2011, the full content of which is hereby incorporated by reference herein.

BACKGROUND

In today's software research and development organizations, an incredible amount of time and resources is typically required in setting up a working environment, which typically includes multiple machines and devices that are networked together and configured to run various software applications and suites that span across the machines and possibly other devices. A proper setup of a working environment typically requires the individual configuration of numerous software components that together form a complex interdependent network of machinery and software installations, but there are various problems associated with setting up these environments. For example, users typically need to learn how to configure each software component in the technology stack but most of those installs may actually be outside their areas of expertise.

The existence of numerous input values and pre-configuration requirements for underlying installations increases the possibility of typographic or misconfiguration errors by a user. Even if the user was somewhat familiar with how to configure the underlying software, a simple user input or configuration error at some point along the way might manifest itself only much later in the technology stack, thereby resulting in a potentially tremendous waste of time.

Human limitations often force some processes to be linear even though some of them might be able to be parallelized with automated software to increase efficiency. Even if the environment can be distributed so that various independent tasks can be executed simultaneously across different machines, though, the user is typically limited to being able to only perform one configuration task at a time.

The manual configuration of specialized environments is usually dependent on individuals who have specific knowledge about those configurations. Should the user be unavailable at any point during the process, all of the knowledge acquired by that user with regard to the setup of the environment would automatically become unavailable. In most cases, users do not want to set up a configuration on their own personal machines but on some other machine of their choosing. However, current frameworks do not allow for remote machines to be used for the execution nor do they provide active communication with these remote machines. Thus, users are typically required to constantly monitor the execution of the associated topology, which provides the pertinent configuration specifications, in setting up the environment.

Current frameworks do not allow for proper exiting from all relevant tasks, let alone reporting of the success or failure of those tasks. Users often desire to trigger a run of their topologies without human intervention so that results are available upon their return, but current frameworks do not allow for scheduling of the execution of topologies at any given time. Also, current frameworks do not allow for a pre-defined selection of topologies to be executed simultaneously based on the user's selection, nor do they effectively indicate whether the set up of a particular software configuration has been validated and certified.

Accordingly, there remains a need for a way to address these and other deficiencies associated with the prior art.

DETAILED DESCRIPTION

As used herein, a topology generally refers to a set of configuration specifications for a working environment. A topology may include, for example, a mapping of physical and/or logical connections between nodes, such as computers or other electronic machines or devices in the environment, and individual requirements or preferences for any or all of the individual nodes or other components of the environment. A topology may also include various settings and parameters for software programs and/or suites that are to be used on, within, or in connection with the environment.

A topology in accordance with the disclosed technology generally includes multiple building blocks or "mini programs," which generally represent programs that are designed to install and/or configure relatively small portions, sub-parts, or aspects of the environment, such as a database or certain portions or characteristics of the database. Execution of a topology generally refers to the setting up of the environment by executing each of the associated building blocks in accordance with the topology.

The disclosed technology generally pertains to a distributed topology environment (DTE) framework that may be used to provide users with the ability to automatically configure complex software programs. The disclosed DTE framework may provide a Software-as-a-Service (SaaS) solution that may be leveraged to enable companies or individual users to quickly create reproducible environments of complex software installations. Certain implementations of this automation framework incorporate multiple layers of cloud computing in delivering solutions as an integrated service to end users.

The DTE framework may also allow for debugging and quality assurance testing of such installations, providing companies and users with significant savings in time and resources, particularly with regard to development groups, quality assurance teams, and support staff members. Such realized improvements in development and quality assurance typically result in a streamlining of the code approval process because changes in code may be immediately verified in valid customer scenarios before being introduced into the pertinent product(s).

Embodiments of the DTE framework described herein generally conform to the model of cloud computing in providing a service for the automated configuration of software in a simple and easily understood way without requiring that its users have knowledge of how the service is provided. Whereas certain tasks have been previously automatable, such as certain installs and quality assurance test suites, for example, current systems do not provide complete automation of such tasks from start to finish without requiring some type of manual intervention between tasks. Implementations of the DTE framework, however, generally allow for full testing against valid customer-specific configurations.

Figure 1:
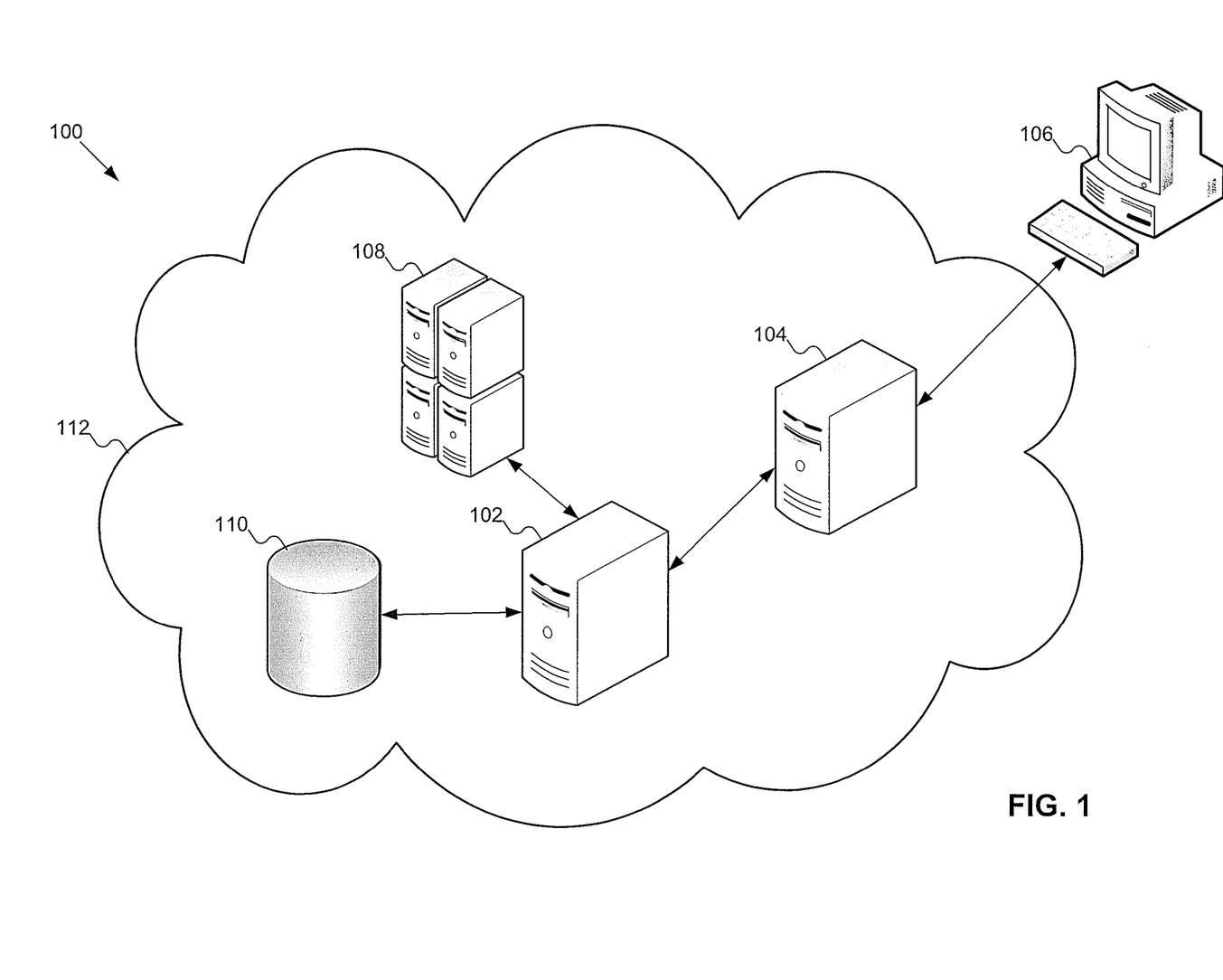
FIG. 1 illustrates an example of a networked system in which embodiments of the disclosed technology may be implemented.

FIG. 1 illustrates an example of a networked system 100 in which embodiments of the disclosed technology may be implemented. A DTE framework as illustrated in FIG. 1 may be effected by multiple applications spanning multiple devices, some or all of which may be referred to as being in the cloud. Such arrangements are generally referred to as cloud computing. In these scenarios, the DTE framework described herein may allow for automated installation and configuration of software products delivered to customers as a SaaS solution.

The system 100 includes a DTE engine 102 that may be implemented on or in connection with a single device such as a central server, for example. The DTE engine 102 may drive a DTE application 104 that may be implemented on or in connection with a webserver, for example. A client device 106, such as an individual user's computer, for example, may interact with the DTE engine 102 through the DTE application 104. In the example, the DTE engine 102 also interacts with, e.g., drives and/or receives information from, one or more execution machines 108.

The DTE engine 102 may interact with a data store 110 that may be implemented as a database on the same machine as the DTE engine 102 or on a separate machine that may be situated remotely from the machine on which the DTE engine 102 primarily resides. The data store 110 may be configured to store building blocks, topology specifications, topology libraries, or any combination thereof. In alternative embodiments, the DTE engine 102 may interact with several data stores that each pertain to different topologies, building blocks, etc.

Embodiments of the DTE framework described herein generally include a thin client-side application or suite of applications configured to communicate with a central server that primarily drives the DTE framework. When used in conjunction with a designated pool of machines, the DTE framework may provide an entire platform and infrastructure as a service. Such implementations may be deployed and scaled across virtually any operating system.

Embodiments of the DTE framework may allow users to create and save mini-programs configured to perform specific tasks based on provided input parameters. The DTE framework may then allow for these tasks to be integrated together into a topology by way of exchanging useful information among the various tasks. In this way a complex install environment can be configured accurately, effectively, and efficiently.

A user may create certain individual tasks or building blocks that may continue to be owned by the block creator but may also be utilized by any other user in connection with the DTE framework to set up different personalized configurations. A building block generally represents a relatively simple task in a computer work-flow process and may include a silent product install task, a silent product configuration task, a test driving task, a script execution task, or virtually any other type of task that may be performed in an automated manner.

Building blocks may be tailored for use with a particular product install process, for example. Building blocks may also be shared with others and, in some embodiments, may be certified for such reuse. A building block as described herein generally includes two components: a building block definition, e.g., an XML definition, and building block logic, e.g., an executable script.

Figure 2:
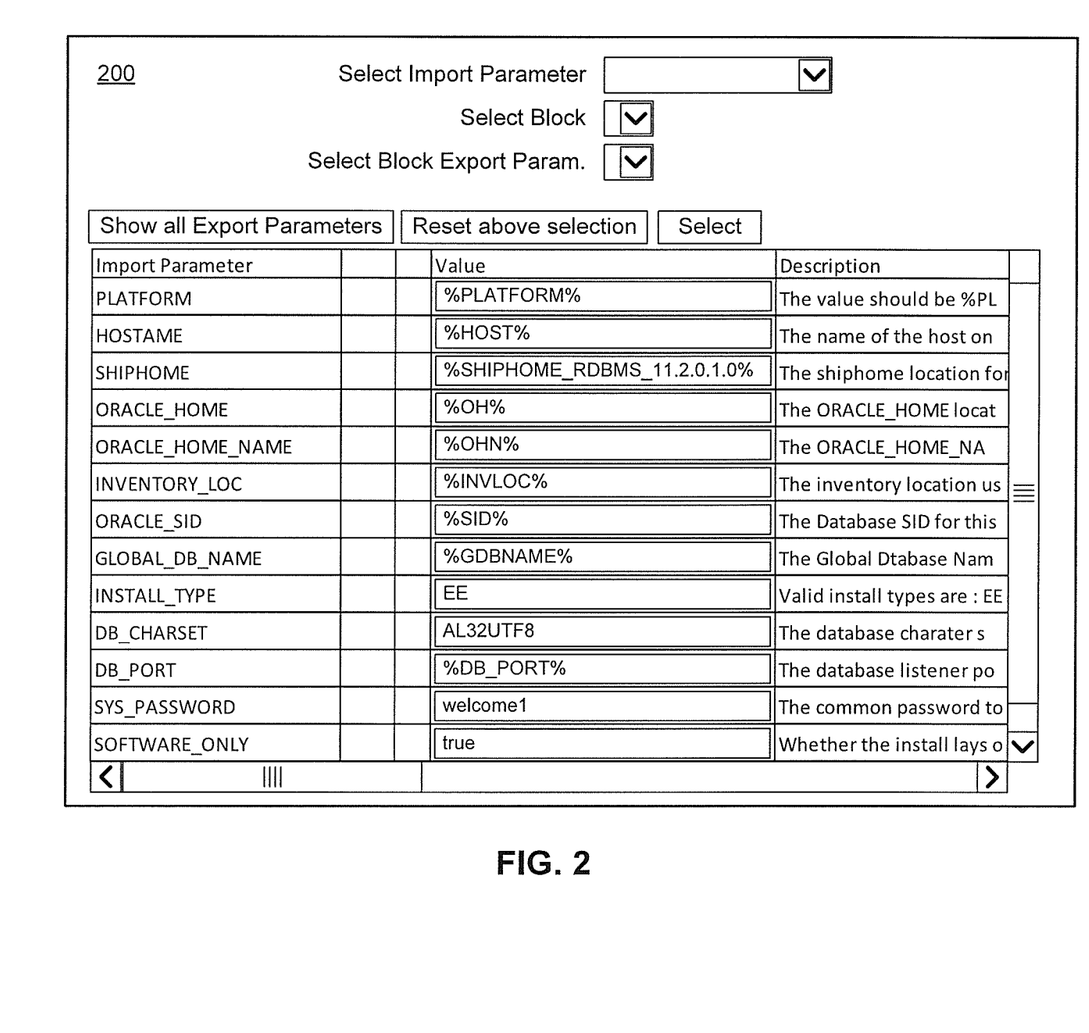
FIG. 2 illustrates an example of a building block interface in accordance with certain implementations of the disclosed technology.

FIG. 2 illustrates an example of a building block interface 200 in accordance with certain implementations of the disclosed technology. The building block interface 200 may be implemented as a web-based application and may provide a graphical user interface (GUI) having multiple tabs such as "Create Building Block," "Edit Building Block," "Building Block Details," "Test Building Block," etc. The "Building Block Details" tab may result in the presentation of a building block details page from which a user may cause a script, such as a Perl script, to be generated on the browser to be saved locally, for example. The "Test Building Block" tab may result in the presenting of a test building block page from which the user may test the selected building block locally, e.g., before saving the building block or making it available to other users.

In the illustrated example, a number of import parameters associated with building block DATABASE1 are displayed along with their corresponding values and descriptions. The import parameters that may be specified for a particular building block may include, but are not limited to, the associated platform, a name of the host on which a database is to be installed, a name of the associated database, and a password, for example. Output parameters of a building block may include, but are not limited to, the execution outcome of a task, e.g., SUCCESS or FAILURE, the host name where the database was installed, and the database listener port number and/or service name (if successful).

A building block in accordance with the DTE framework described herein may be characterized at least in part by the following pseudo-code:

- procedure read_importfile
    read input file containing user-specific parameter values
- procedure read_runtimefile
    read text file containing environment-specific parameter values
- procedure execute_task
    perform task (install, test, etc.)
- procedure write_exportfile
    write output file containing install-specific information Consider an example in which experts of a particular software application or suite may create one or more building blocks specifically tailored for their software. Other users, who may not have similar expertise with this the software, can safely use the pre-made building blocks without having to learn the details of the specific software configuration. For example, a database install expert may create a particular database install block (e.g., DATABASE1 of FIG. 2) that uses a certain installer to automatically configure the database. A script may be used to populate a response file for the install by instantiating relevant values that the user has provided to the building block(s) and, in the case of unspecified parameters during the install, selecting or determining default values for the unspecified parameters.

Upon completion of a certain task during install, information generated by the task itself may be made available to other building blocks in the DTE framework that might benefit from or need such information. In this way, a user who needs the particular database install in his or her environment but is not familiar with the details of the specific configuration may simply use the predefined DATABASE1 install block in the new topology.

DTE framework building blocks may each read input parameters from text files that are generated by the framework based on how that particular building block is defined in the framework. As noted above, a building block may populate a file containing values that other building blocks in the topology may need upon completion of the associated task. Since these values may be saved into files for repeated usage by building blocks the possibility of typographical errors in the input values may be drastically reduced, if not eliminated entirely.

In certain embodiments, two or more building blocks may be arranged together into one or more particular topologies according to the specifications of the environment. These topologies, while typically owned by the creator, may be utilized by virtually any other user in the DTE framework. The topologies can execute independent tasks simultaneously across various machines That is, the DTE framework may spawn a process to execute a first task and, if a second task is not dependent on the first, the DTE framework may spawn a process to execute the second task simultaneously. These tasks may be on the same hardware resource or on different hardware resources, resulting in significant execution time savings during the set up of the desired configuration.

Figure 3:
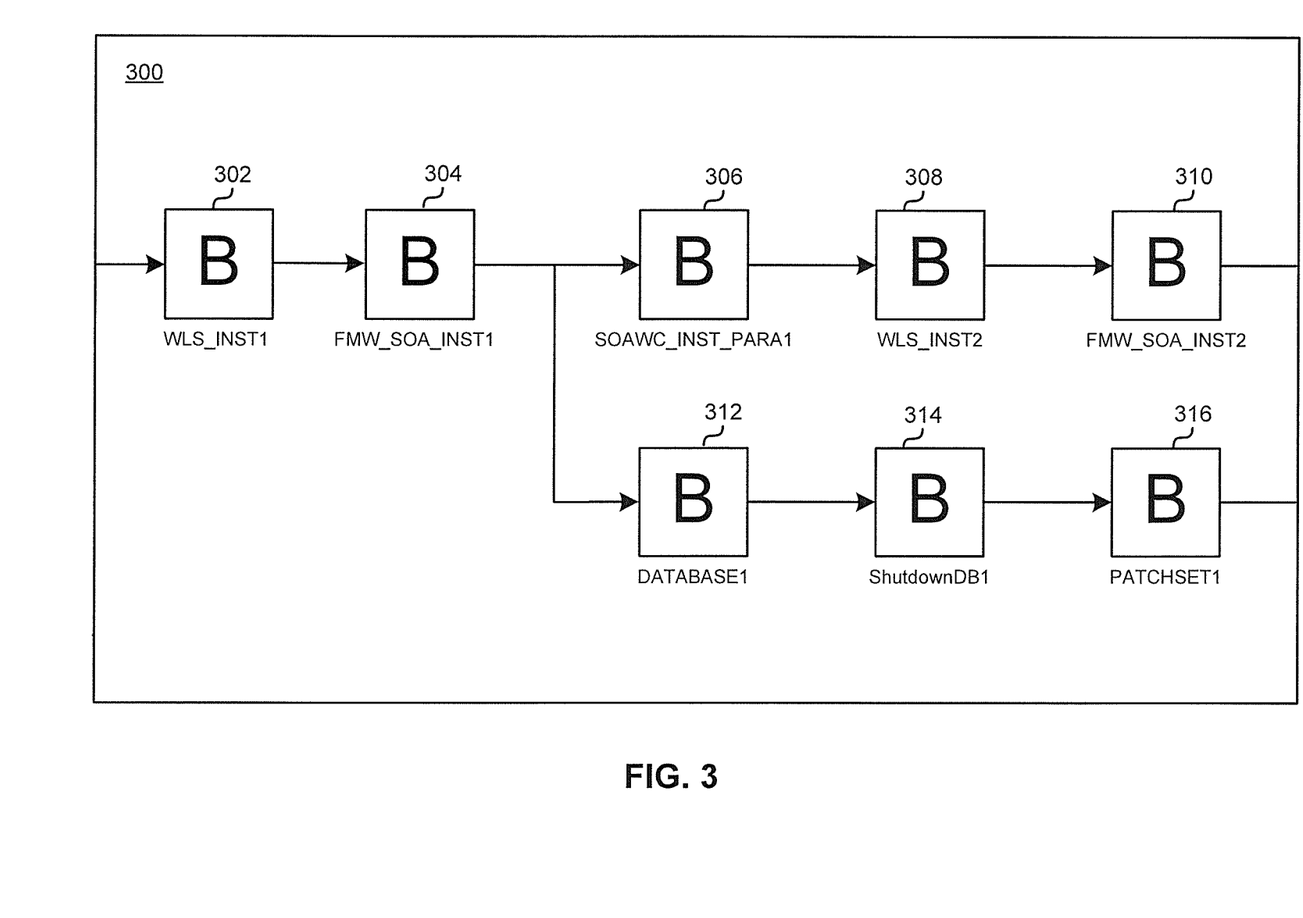
FIG. 3 illustrates an example of a topology creator interface in accordance with certain implementations of the disclosed technology.

FIG. 3 illustrates an example of a topology creator interface 300 in accordance with certain implementations of the disclosed technology. In the example, a number of building blocks 302-316 have been selected as part of the topology being created. The building blocks may be arranged in virtually any order and combination, depending on the desired resulting configuration upon execution of the topology. One of the building blocks (312) in the example is the building block DATABASE1 of FIG. 2. Once the topology creator is satisfied with the topology, he or she may save the topology. The topology may be saved locally, at remote storage (such as a central server or database), or both.

The illustrated example indicates that, when the topology is executed, building block 302 is to be executed before any of the other building blocks 304-316. Once the second building block 304 has executed, however, parallel execution may begin in accordance with a branching structure of the topology. More specifically, building blocks 306 and 312 may be executed concurrently. Building blocks subsequent to 306 and 312, e.g., 308-310 and 314-316, respectively, may be executed concurrently or dependent upon other factors as specified by the topology creator.

In certain embodiments, the DTE framework may allow creators or administrators to define certified topologies. Certified topologies generally refer to topologies that have been validated and certified for use in connection with the specific configurations that they are primarily intended to address. Certified topologies may be released to customers along with corresponding software, for example. In such scenarios, a certified topology may be enable the customer to install and configure the product in an automated and efficient manner with a significant reduction in—or even complete elimination of—errors that might otherwise be manifested during an installation in accordance with current procedures.

With regard to the topology shown in the interface 300 of FIG. 3, for example, the creator may desire to make the topology available to others for future implementations and may do so by testing and validating the topology. Upon successful testing and/or validation, the creator may designate the topology as certified. In certain embodiments, another user such as an administrator must approve of the certification before allowing other users to be notified of the certified status of the topology.

In certain embodiments, a user may create a topology manually by way of creating an XML file and then importing the XML file using the topology creator interface 300, for example. Alternatively or in addition thereto, a user may export an XML file of a topology using the topology creator interface 300, edit the XML file manually, and then import the modified XML file by way of the interface 300, for example.

Once a topology is saved within the DTE framework, it is generally owned by its creator and, unless another user has been granted administrative privileges on the topology, only the creator may modify the topology. However, the topology may be made available for use by any registered DTE user. In situations where a certain user likes a particular topology but wants to customize it further, the user may clone the topology. The resulting cloned topology will thus be owned by the user who performed the cloning and can then be modified as needed by the user.

Figure 4:
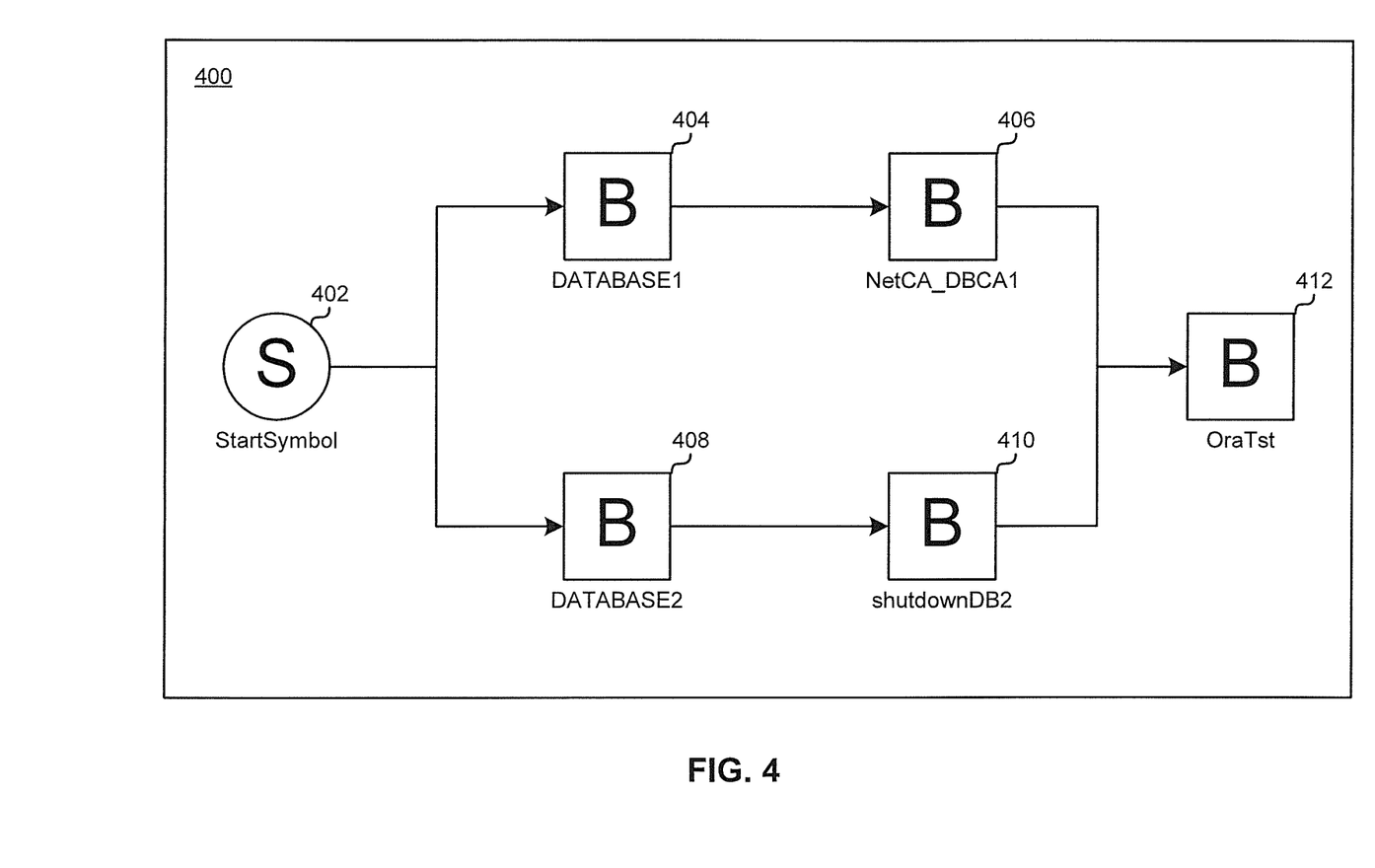
FIG. 4 illustrates an example of a topology editor interface in accordance with certain implementations of the disclosed technology.

FIG. 4 illustrates an example of a topology editor interface 400 in accordance with certain implementations of the disclosed technology. In the example, the topology editor interface 400 is presenting a topology that includes a starting module 402 and multiple building blocks 404-412, one of which (404) represents the DATABASE1 building block in the examples illustrated by FIGS. 2 and 3 and described above.

The topology editor interface 400 may present a number of features and options to the user. For example, the user may rearrange any or all of the building blocks 404-412. The user may also delete and/or clone any of the building blocks 404-412. For example, a DATABASE2 building block (408) may be a cloned version of the DATABASE1 building block (404) with (or without) modification. In certain embodiments, the user may import and/or export certain XML files to be used in connection with any of the building blocks 404-412.

In certain embodiments, a topology editor interface may offer the user with a standard look and feel while provide graphical representations of complex concepts such as inheritance of topologies. A topology editor may interact with a strong data structure that allows in-memory operations but is flexible enough to handle new requirements. The topology editor may also be adaptable for certain enhancements such as partial execution of topology.

In certain embodiments, the DTE framework may include a lightweight proxy listener written using the Perl interpreter, for example. If this listener is started on any associated machine, the DTE framework may communicate with the listener and perform the execution of a topology on that machine, regardless of how remote the machine may be.

The DTE framework may include a reporting mechanism for a topology. The reporting mechanism may consist of the status for each individual building block within the topology. For example, a certain database install block may have a routine that analyzes the install log generated by a certain install to determine whether the install succeeded or failed. The subsequent generation of a file with a particular extension (e.g., .suc or .dif) may be used to indicate in the report whether that particular task succeeded or failed.

A DTE engine may be used to execute topologies and create reports of executed tasks, for example. The DTE engine may be used to set up a topology in a distributed environment involving multiple systems that may involve multiple operating systems. The DTE engine may effectively act as a central console process though it does not need to be situated at or on any of the involved systems.

In certain embodiments, the DTE engine is programmed in Java. The DTE engine may also communicate with remote machines in implementations that include a DTE proxy listener, for example. In these embodiments, the DTE engine may communicate with the remote machine(s) over a TCP/IP network to perform the entire execution of a selected topology remotely, for example.

The DTE engine, which is also referred to as a DTE execution handler, in accordance with the DTE framework described herein may read and parse a topology definition file for a specific topology, ping the participating system(s) of the distributed environment and check the validity thereof, look for and analyze any building block dependencies in the topology definition, and process the building blocks in accordance with the execution order specified by the topology. The DTE engine may be characterized at least in part by the following pseudo-code:

```
• procedure TopologyProcessor (topology)
    retrieve topology information
    organize building blocks in order based on dependencies specified
    in topology
    call LocalTaskProcess for each block successively in order
• procedure LocalTaskProcess (machine, block)
    execute a single block on the specified machine
• procedure CreateHTMLReport (machine, block)
    summarize executed job based on sucs/difs
    write output to HTML file
• procedure Proxy (machine, port)
    start a listener on the specified machine using the provided port
    return status of the listener
```

An entire topology (or set of multiple topologies) may be executed on a single machine. In these embodiments, the building blocks of each topology are generally executed in the sequence specified by the topology.

In certain embodiments, the DTE framework may allow users to define sets of topologies, which will be referred to herein as toposets. When used in connection with a pool of machines, the topologies of a given toposet may all be executed simultaneously across different hardware resources. In these embodiments, which will typically include complex topologies and/or multiple topologies, building blocks of one or more of the topologies may be executed across multiple hosts, e.g., on different devices. Also, different building blocks of one or more of the topologies may be executed in parallel, subject to any dependencies specified by the topology or limitations presented by the device(s) on which the building blocks are executed. Development and testing teams may use toposets to conveniently organize multiple topologies.

Certain implementations of the DTE framework include a DTE log analysis module that may be used to determine the status of a particular task. The following is an example of pseudo-code implementing a DTE log analysis module:

```
procedure analyze_task_log
    if "success" string found in log file
        if exceptions or errors found in log file
            create .dif file
            return status = ACCEPTABLE
        else
            create .suc file
            return status = SUCCESS
    else
        create .dif file
        return status = FAILURE
```

A summary of the status for multiple tasks may be formulated into a report, such as an HTML report, which may be based on any .dif or .suc files created during analysis. A results archive may be used to store any or all generated reports. In certain embodiments, only some reports, such as critical logs, for example, are stored. Also, logs pertaining to an entire environment may be stored in a compressed file.

In certain embodiments, the DTE framework described herein may include a scheduler that users may use to have one or more specified topologies executed at specified time(s) and location(s). For example, a user may specify that a certain topology is to be executed on a particular machine at a designated time or, if the machine is unavailable at the desired time, then it should be executed on an assigned secondary device.

Figure 5:
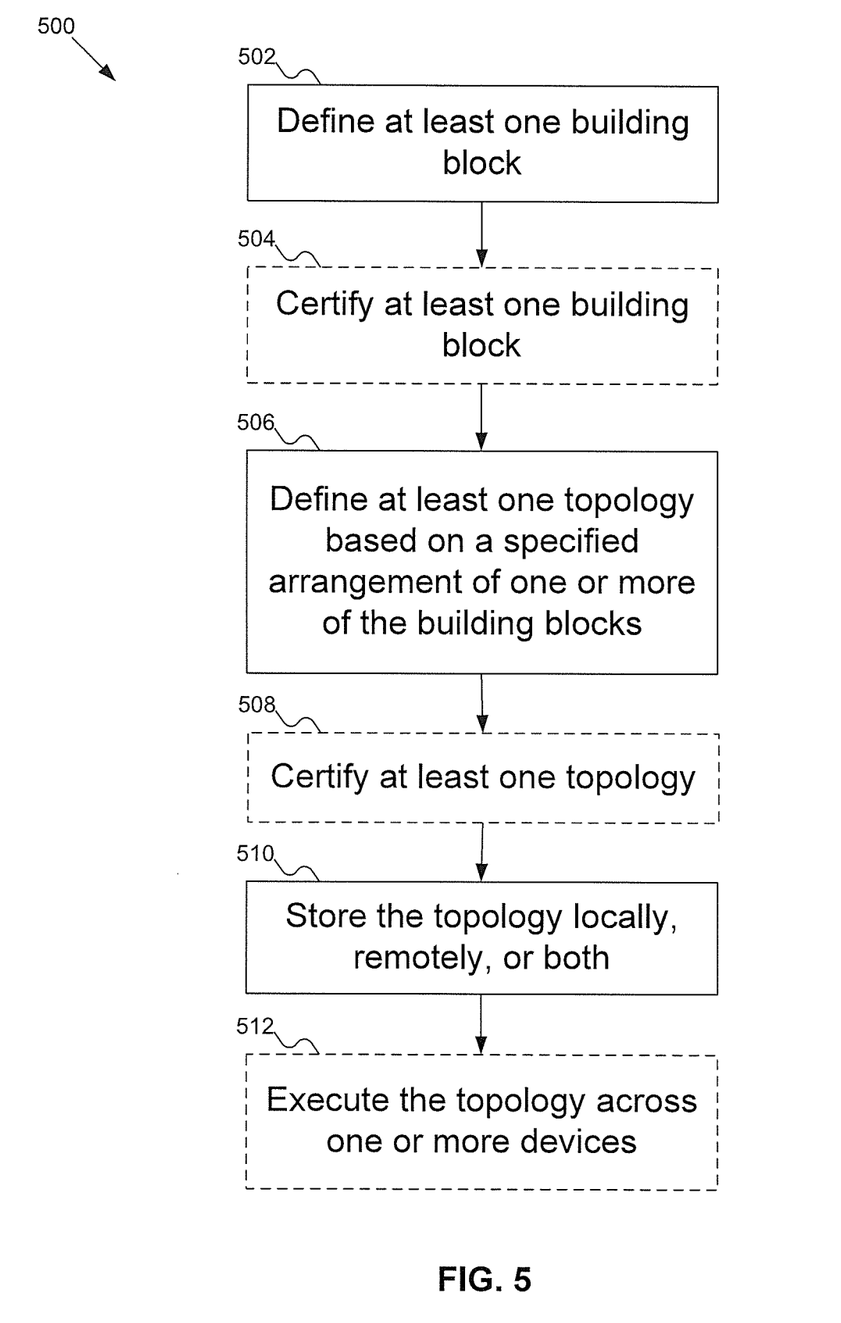
FIG. 5 illustrates an example of a method of managing building blocks and topologies in accordance with certain implementations of the disclosed technology.

FIG. 5 illustrates in example of a method 500 of managing building blocks and topologies in accordance with implementations of the disclosed technology. At 502, one or more building blocks are defined in accordance with any of the pertinent techniques described above. In an optional operation at 504, one or more building blocks may be certified. In certain embodiments, for example, a building block must be certified before it can be used in a topology or re-used by another user in another topology.

At 506, one or more topologies are defined in accordance with any of the corresponding techniques described above. For example, a user may use the topology creator interface 300 of FIG. 3 or the topology editor interface 400 of FIG. 4 to create a new topology or modify a previously-created topology. In an optional operation at 508, one or more topologies may be certified. In certain embodiments, for example, a topology must be certified before it can be executed or implemented in connection with other topologies, e.g., re-used by other users.

At 510, the one or more topologies may be stored locally, remotely, or both, e.g., in the data store 110 of FIG. 1. In an optional operation at 512, at least one topology is executed as directed by a user or scheduling mechanism, for example. A DTE engine, such as the engine 102 of FIG. 1, may execute the topology by executing each of the topology's building blocks in accordance with the specified sequence. The DTE engine may execute or cause to be executed the building blocks of the topology in sequence, in parallel, or both on the client machine 106, web server 104, and/or execution machines 108 of FIG. 1, for example.

Figure 6:
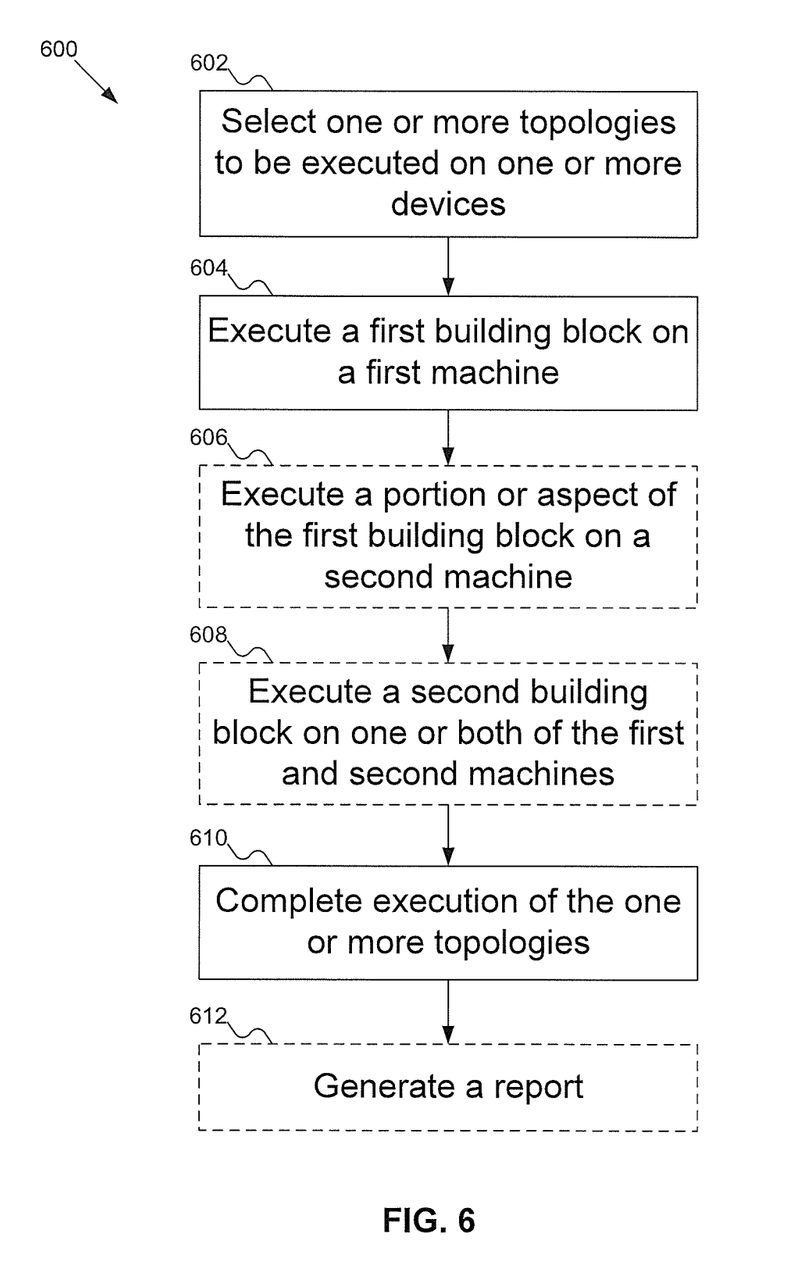
FIG. 6 illustrates an example of a method of executing a topology in accordance with certain implementations of the disclosed technology.

FIG. 6 illustrates an example of a method 600 of executing a topology in accordance with implementations of the disclosed technology. At 602, one or more topologies are selected for execution, e.g., by a user or scheduler. The one or more topologies are to be executed on one or more devices as specified by topology definitions, for example. At 604, a first building block is executed on a first device, e.g., machine.

In optional operations at 606 and 608, respectively, a subpart of the first building block may be executed on a first machine and a second building block (or portion thereof) may be executed on one or both of the machines and/or on a third machine. The operations at 604-608 generally continue until the building blocks to be executed have either successfully completed or encountered an error or other reason for early termination.

At 610, the one or more topologies complete execution and, in an optional operation at 612, a report may be generated in accordance with the techniques described above. The report may be stored and/or sent to a particular destination, e.g., via email. In certain embodiments, the report may be generated during execution of one or more of the building blocks to be executed. In these embodiments, real-time status updates, including alerts and error messages, may be provided to the user and/or administrator. The generated report may be saved in a data store by itself or in connection with other reports and may be stored as a compressed file.

Figure 7:
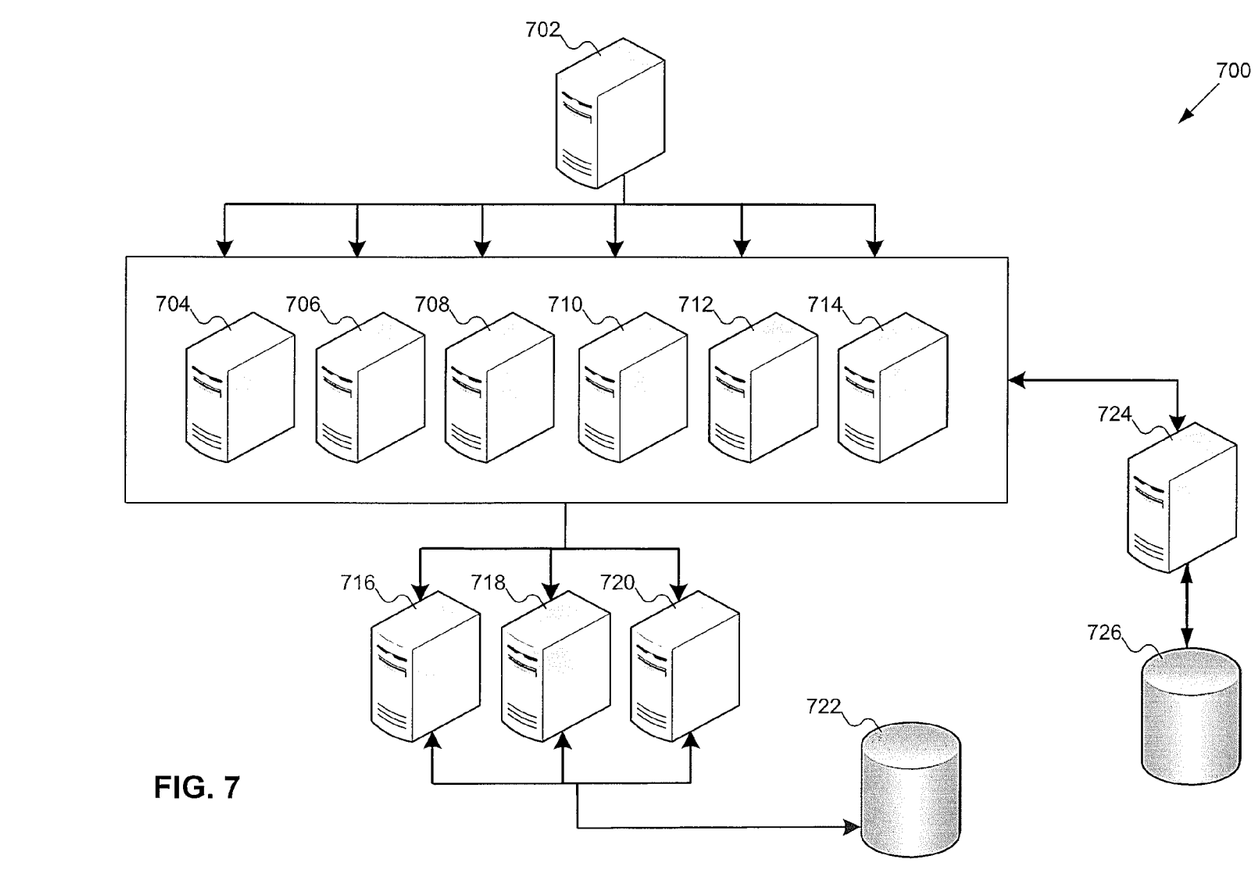
FIG. 7 illustrates an example of a system in which embodiments of the disclosed technology may be implemented.

FIG. 7 illustrates an example of a DTE system 700 in which embodiments of the disclosed technology may be implemented. In the example, the system 700 includes a load balancer 702 coupled with a pool of host machines 704-714, any or all of which may communicate with one or more database hosts 716-720. In the example, the load balancer 702 is configured as a front-end for the topology configuration.

The DTE system 700 incorporates a topology that may be specifically geared toward meeting customers' complex configuration needs. For example, the system 700 may allow for complete provisioning of virtually any number of Oracle Fusion Applications product families, distributed across separate nodes, such as a Customer Relationship Management (CRM) product (e.g., on hosts 706 and 712), a Financial Management (FINS) product (e.g., on host 712), a Human Capital Management (HCM) product (e.g., on host 708), a Procurement and Sourcing (PRC) product (e.g., on host 708), a Project and Portfolio Management (PRJ) product (e.g., on host 710), and a Supply Chain Management (SCM) product (e.g., on host 710).

In the illustrated example, an Oracle Business Intelligence (BI) product (e.g., on host 714) may also be configured in accordance with the needs of the configuration of any or all of the products listed above. The DTE system 700 also includes an identity management (IdM) host 724 configured to run an Oracle IdM suite that may interact with any or all of the hosts 704-714 as well as an accompanying IdM database 726, such as an Oracle Database. The Oracle IdM suite and IdM database 726 may be configured for use with Oracle Fusion Application provisioning, for example.

In the example, the configuration of the database hosts 716-720 may specify interaction with an Oracle Real Application Clusters (RAC) database 722. The system 700 may provide a user with flexibility to either specify a pre-configured RAC database for use or have the RAC database 722 configured as part of the topology for the DTE system 700.

Figure 8:
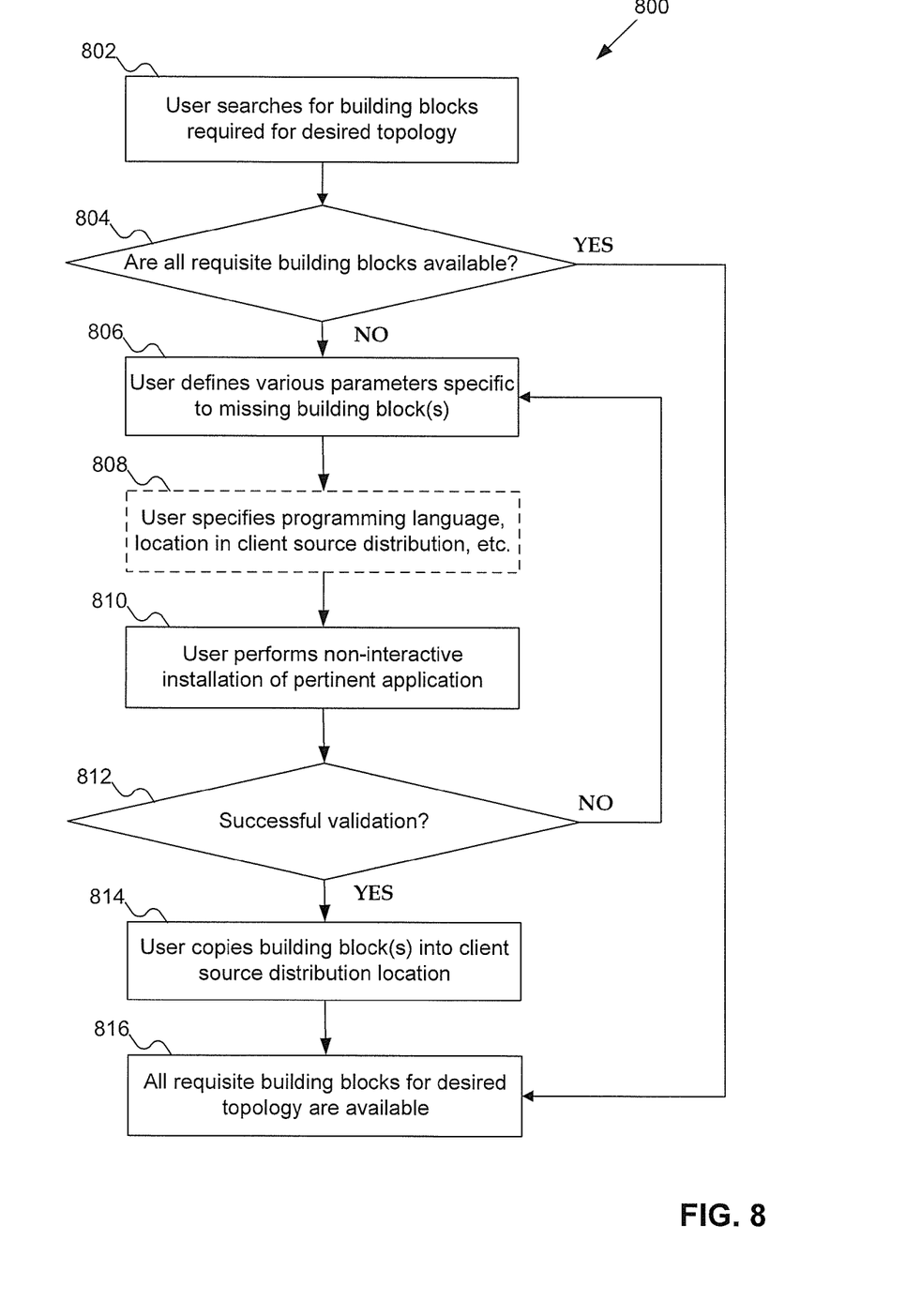
FIG. 8 illustrates an example of a method of implementing building blocks using a DTE building block editor in accordance with certain implementations of the disclosed technology.

FIG. 8 illustrates an example of a method 800 of implementing building blocks using a DTE building block editor in accordance with certain implementations of the disclosed technology. At 802, a user may perform a search in DTE building block functionality of a DTE graphical user interface (GUI) application for certain building blocks that correspond to a desired topology. At 804, a determination is made as to whether all of the building blocks required for the desired topology are available. If so, the method advances to 816; otherwise, the method 800 proceeds to 806.

In certain embodiments, most or even all of the requisite building blocks will already have been created and certified by experts on the corresponding installation and configuration. In the example, however, all of the required building blocks are available except for a particular building block, e.g., a building block pertaining to the configuration of a certain application, such as the Oracle BI product on host 714 in the DTE system 700 of FIG. 7. Thus, the method proceeds to 806.

At 806, the user may define the import and runtime parameters that are required for the building block's operations, as well as the parameters that the building block will export, using the DTE Building Block Editor functionality in the DTE GUI application. The user may then specify the programming language in which the building block will be implemented, as well as the location in which the building block will be included within the DTE client source distribution, as indicated at 808.

At 810, the user may implement a program or script to perform the non-interactive installation of the pertinent application, here the Oracle BI product. Tasks may include generating a response file, setting up environment variables, invoking the installation, analyzing the logs to assess whether the attempt to install was successful, and exporting data from the block accordingly, for example.

At 812, a validation attempt is made to validate that the application is functioning correctly. If the validation is unsuccessful, the method 800 returns to 806 so that the user may double-check the defined parameters and troubleshoot the problem, if needed; otherwise, the user may copy the building block into the appropriate location in the DTE client source distribution, as indicated at 814. This makes the building block immediately available for use in a topology.

At 816, a confirmation is provided that all of the requisite building blocks for the desired topology are available for implementation.

Figure 9A:
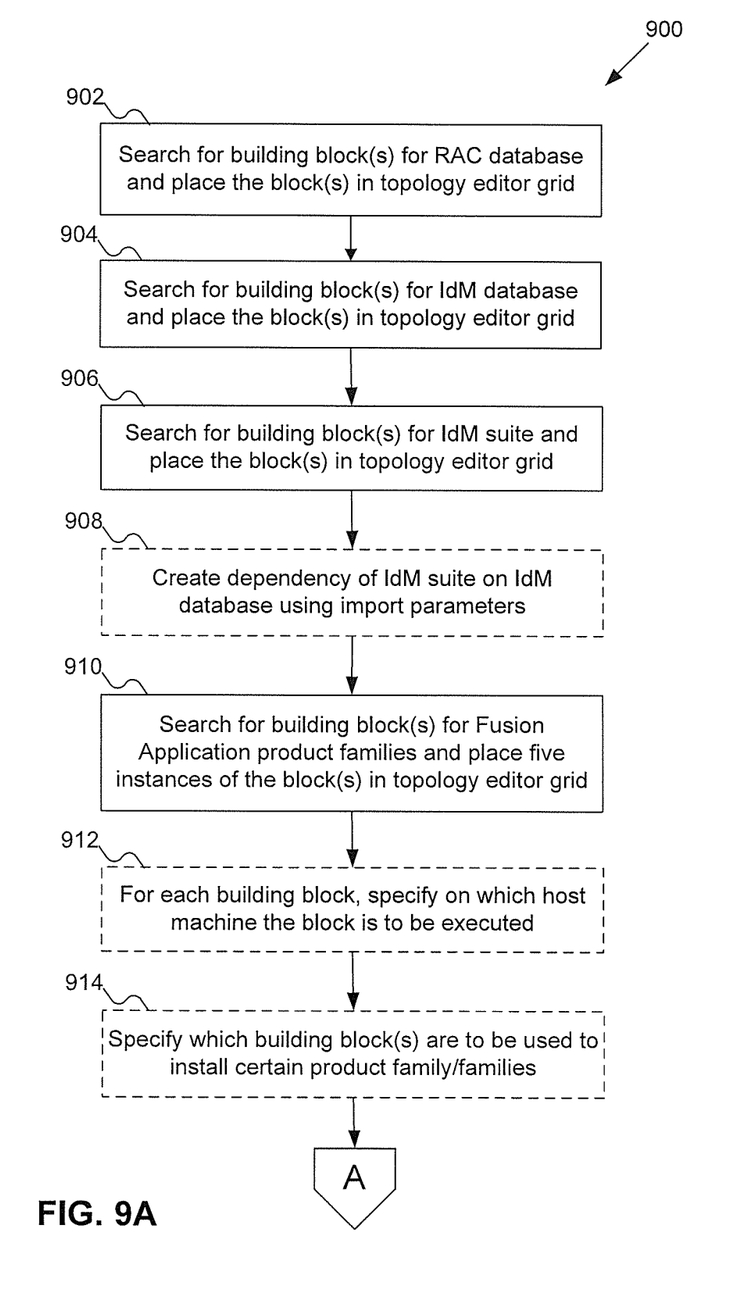
FIG. 9 illustrates an example of a method of developing a topology using a distributed topology environment (DTE) topology editor in accordance with certain implementations of the disclosed technology.
Figure 9B:
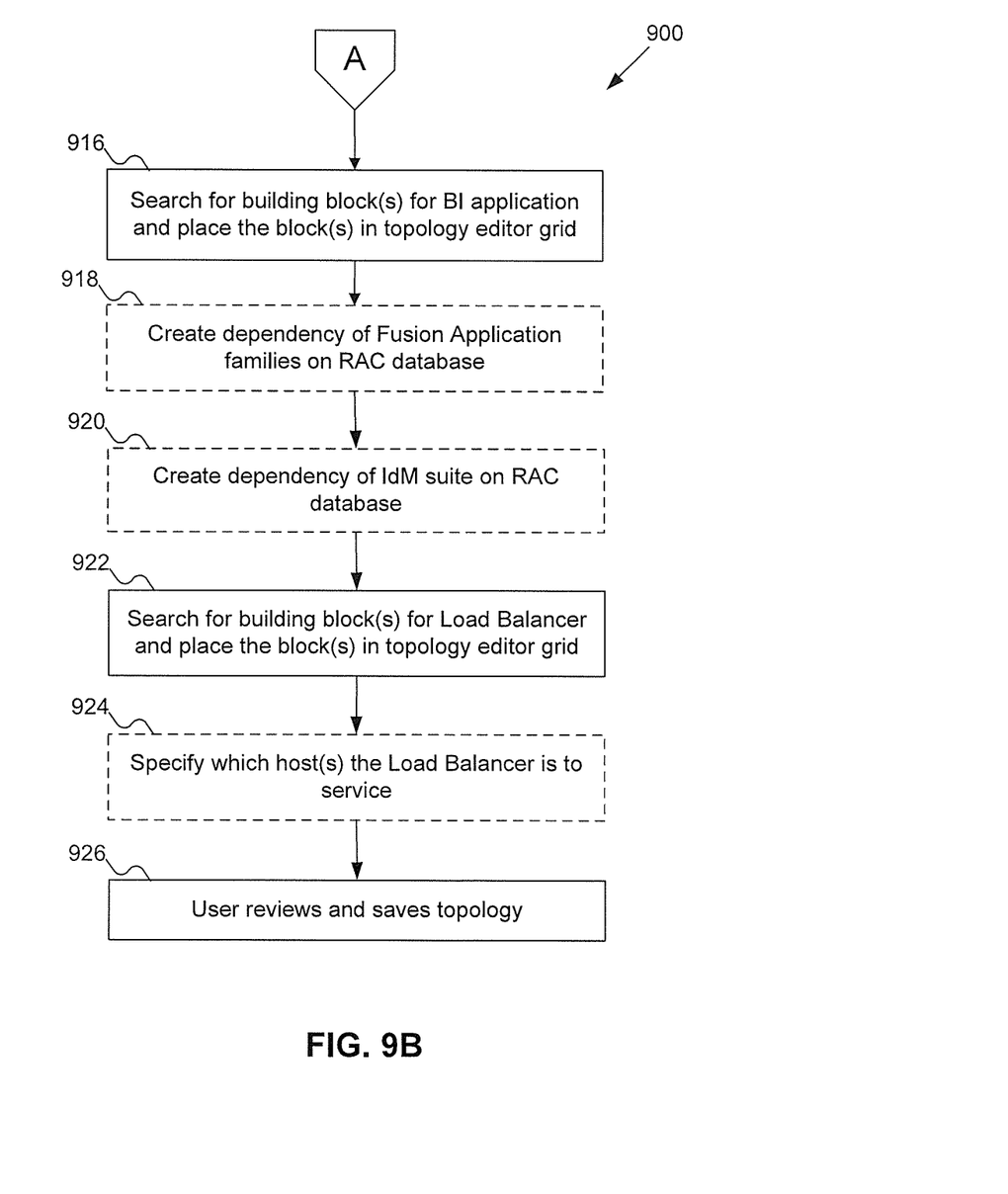

FIG. 9 illustrates an example of a method 900 of developing a topology using a DTE topology editor in accordance with certain implementations of the disclosed technology. At 902, a user may perform a search using the DTE Building Block functionality of the DTE GUI application to identify the certified building block(s) for installing an Oracle RAC Database, such as the RAC database 722 in the DTE system 700 of FIG. 7, and place the building block in the DTE Topology Editor grid.

At 904, the user may perform a search using the DTE Building Block functionality in the DTE GUI application to identify the certified building block(s) for installing an Oracle IdM Database, such as the IdM database 726 in the DTE system 700 of FIG. 7, to be used for an IdM suite, such as the IdM suite on the IdM host 724 in the DTE system 700, and place the building block in the DTE Topology Editor grid.

At 906, the user may perform a search using the DTE Building Block functionality in the DTE GUI application to identify the certified building block(s) for installing the Oracle IdM suite and place the building block in the DTE Topology Editor grid. The user may use the import parameters for this building block to create a dependency of the IdM suite on the IdM database created at 904, as indicated at 908.

At 910, the user may perform a search using the DTE Building Block functionality in the DTE GUI application to identify the certified building block(s) for installing Oracle Fusion Application product families and, in the example, place five instances of this block in the DTE Topology Editor grid. Using the import parameters for the building blocks, the user may specify that each building block is to be executed on a separate host machine, as indicated at 912. The user may also specify which product family/families (e.g., CRM, HCM, or PRJ) are to be installed by each building block in accordance with the preferred design, as indicated at 914.

At 916, the user may perform a search using the DTE Building Block functionality in the DTE GUI application to identify the certified building block(s) for installing an Oracle Business Intelligence (BI) product, such as that on host 714 in the DTE system 700 of FIG. 7, and place the block in the DTE Topology Editor grid.

At 918, the user may use the import parameters for the blocks created at 910-916 to create a dependency of each of these blocks on the RAC database created at 902. The user may also create a dependency of the IdM suite created at 906-908 on the RAC database, as indicated at 920.

At 922, the user may perform a search using the DTE Building Block functionality of the DTE GUI application to identify the certified building block(s) for configuring a Load Balancer, such as the load balancer 702 in the DTE system 700 of FIG. 7, and place the block in the DTE Topology Editor grid. Using the import parameters for this building block, the user may specify that the Load Balancer will service the hosts created at 910-916 and/or other hosts, as indicated at 924.

At 926, the user may review and save the topology using the DTE GUI application.

Figure 10:
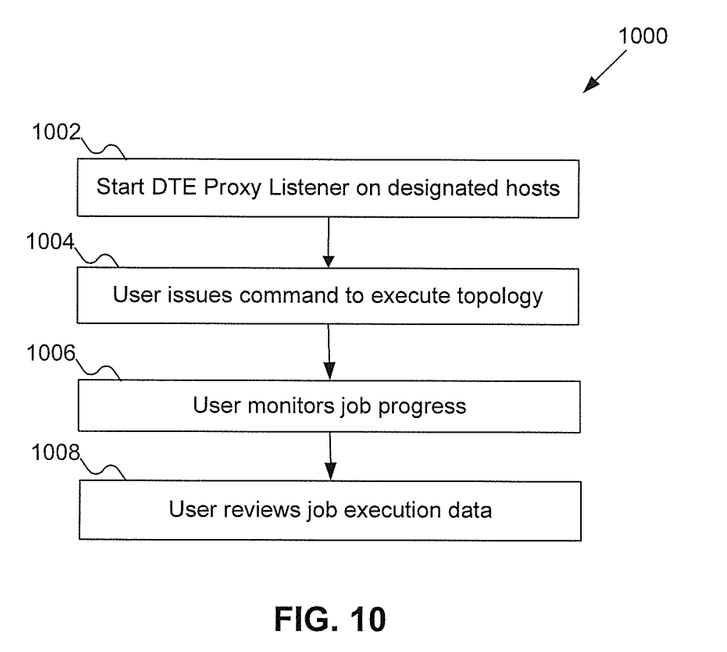
FIG. 10 illustrates an example of a method of implementing a topology using a DTE topology editor in accordance with certain implementations of the disclosed technology.

FIG. 10 illustrates an example of a method 1000 of implementing a topology using a DTE topology editor in accordance with certain implementations of the disclosed technology. At 1002, a user may ensure that the DTE client is installed on the various hosts targeted for the particular configuration and then run the executable to start the DTE Proxy Listener on each of those hosts. This establishes communication among the target hosts, the user's host machine from which the topology execution is to be triggered, and the central DTE database in which the DTE topology metadata is stored.

At 1004, the user may then issue a command to execute the topology either using the DTE Executor functionality in the DTE GUI application or using the DTE Executor command-line tool.

At 1006, the user may then monitor the job progress using the DTE Job Monitor functionality of the DTE GUI application or using the DTE Job Monitor command-line tool.

After the job completes, the user may review the job execution data using the DTE Job Report functionality in the DTE GUI application or using the DTE Job Report command-line, as indicated at 1008.

Once a topology is available in the system, any user may typically execute the topology but privileges to modify the topology will generally remain solely with the original creator and any administrators assigned to the topology. A user may clone the topology, however, in order to have ownership over the cloned topology. Once the user owns a topology, that user may then modify the topology as much and/or often as needed.

For example, a certain topology may be used by Oracle Fusion Applications Quality Assurance teams by appending a block or blocks to the topology that execute automated sanity tests of the system configuration. The DTE framework described herein is generally flexible enough to support any available automated testing tool, whether for back-end testing or UI-based testing.

Based on the user's preference, the distribution of building blocks across various host machines can be modified easily by changing the respective block's import parameter in the topology. In this manner, some of the blocks in the pertinent configuration may be combined on the same host.

Consider a scenario in which a new version of an Oracle Database becomes available, along with a corresponding building block for database. A user may select the corresponding database building block in the pertinent topology and simply have the block replaced with the building block that corresponds to the new release version. This may be done by way of using a drop-and-replace button in the DTE GUI application, for example. In this situation, all of the import parameters and other settings from the existing block, as well as the rest of the topology, will remain intact.

The following discussion is intended to provide a brief, general description of a suitable machine in which embodiments of the disclosed technology can be implemented. As used herein, the term "machine" is intended to broadly encompass a single machine or a system of communicatively coupled machines or devices operating together. Exemplary machines may include computing devices such as personal computers, workstations, servers, portable computers, handheld devices, tablet devices, and the like.

Typically, a machine includes a system bus to which processors, memory such as random access memory (RAM), read-only memory (ROM), and other state-preserving medium, storage devices, a video interface, and input/output interface ports can be attached. The machine may also include embedded controllers such as programmable or non-programmable logic devices or arrays, Application Specific Integrated Circuits (ASICs), embedded computers, smart cards, and the like. The machine may be controlled, at least in part, by input from conventional input devices such as keyboards and mice, as well as by directives received from another machine, interaction with a virtual reality (VR) environment, biometric feedback, or other pertinent input.

The machine may utilize one or more connections to one or more remote machines, such as through a network interface, modem, or other communicative coupling. Machines can be interconnected by way of a physical and/or logical network, such as an intranet, the Internet, local area networks, wide area networks, etc. One having ordinary skill in the art will appreciate that network communication may utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

Embodiments of the disclosed technology may be described by reference to or in conjunction with associated data including functions, procedures, data structures, application programs, instructions, etc. that, when accessed by a machine, may result in the machine performing tasks or defining abstract data types or low-level hardware contexts. Associated data may be stored in, for example, volatile and/or non-volatile memory, such as RAM and ROM, or in other storage devices and their associated storage media, which can include hard-drives, floppy-disks, optical storage, tapes, flash memory, memory sticks, digital video disks, biological storage, and other non-transitory, physical storage media.

Associated data may be delivered over transmission environments, including the physical and/or logical network, in the form of packets, serial data, parallel data, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

We claim:

1. A distributed topology system, comprising:
   a distributed topology engine configured to run on a server device and define a topology comprising a plurality of building blocks, each building block representing at least one task pertaining to an application;
   a distributed topology application configured to run on a client device and automatically execute at least one of the plurality of building blocks; and
   a distributed topology database configured to store the topology, wherein the topology specifies that a first one of the plurality of building blocks is to be executed on a first host and a second one of the plurality of building blocks is to be executed on a second host, and wherein the topology further specifies that the first and second ones of the plurality of building blocks are to be executed at least partially concurrently with each other.

2. The distributed topology system of claim 1, wherein at least one of the plurality of building blocks is defined by a user.

3. The distributed topology system of claim 1, wherein at least one of the plurality of building blocks comprises installation information pertaining to the application.

4. The distributed topology system of claim 3, wherein the installation information identifies a particular host on which the application is to be installed.

5. The distributed topology system of claim 1, wherein the distributed topology engine is further configured to define a second topology comprising at least one of, but less than all of, the plurality of building blocks.

6. The distributed topology system of claim 5, wherein the distributed topology database is further configured to store the second topology.

7. The distributed topology system of claim 1, wherein the distributed topology application is configured to execute at least two of the plurality of building blocks in a specified sequence defined by the topology.

8. The distributed topology system of claim 1, further comprising a topology editor configured to allow a user to edit the topology.

9. The distributed topology system of claim 8, wherein the topology editor is configured to allow the user to edit at least one of the plurality of building blocks.

10. A system, comprising:
    a plurality of host machines, each host machine hosting at least one of a group of applications consisting of: a Customer Relationship Management (CRM) application, a Financial Management (FINS) application, a Human Capital Management (HCM) application, a Procurement and Sourcing (PRC) application, a Project and Portfolio Management (PRJ) application, and a Supply Chain Management (SCM) application;
    a load balancer configured to service each of the plurality of host machines;
    a Real Application Clusters (RAC) database coupled with the plurality of host machines;
    a user-defined topology configured to specify interactions between the plurality of host machines, the load balancer, and the RAC database; and
    an identity management (IdM) host machine coupled with the plurality of host machines and configured to run an IdM suite to interact with at least one of the applications hosted by at least one of the plurality of host machines, wherein the user-defined topology is further configured to specify interactions between the IdM host machine and the plurality of host machines.

11. The system of claim 10, further comprising an IdM database coupled with the IdM host machine, wherein the user-defined topology is further configured to specify interactions between the IdM database and the IdM suite.

12. The system of claim 10, further comprising at least one database host coupled between the plurality of host machines and the RAC database, wherein the user-defined topology is further configured to specify interactions between the at least one database host and the plurality of host machines.

13. The system of claim 10, wherein the topology comprises a plurality of building blocks, each building block specifying installation parameters for at least one of the applications.

14. A computer-controlled method, comprising:
    a distributed topology engine running on a server device and defining a topology comprising a plurality of building blocks, each building block representing at least one task pertaining to an application;
    a distributed topology application running on a client device and automatically executing at least one of the plurality of building blocks; and
    a distributed topology database storing the topology, wherein the topology specifies that a first one of the plurality of building blocks is to be executed on a first host and a second one of the plurality of building blocks is to be executed on a second host, and wherein the topology further specifies that the first and second ones of the plurality of building blocks are to be executed at least partially concurrently with each other.

15. The computer-controlled method of claim 14, further comprising a topology editor allowing a user to edit the topology.

16. The computer-controlled method of claim 15, further comprising the topology editor allowing the user to edit at least one of the plurality of building blocks.

17. The computer-controlled method of claim 14, wherein at least one of the plurality of building blocks is defined by a user.

18. The computer-controlled method of claim 14, wherein at least one of the plurality of building blocks comprises installation information pertaining to the application.

19. The computer-controlled method of claim 18, wherein the installation information identifies a particular host on which the application is to be installed.

20. The computer-controlled method of claim 14, further comprising the distributed topology engine defining a second topology comprising at least one of, but less than all of, the plurality of building blocks.

21. The computer-controlled method of claim 20, further comprising the distributed topology database storing the second topology.

22. The computer-controlled method of claim 14, further comprising the distributed topology application executing at least two of the plurality of building blocks in a specified sequence defined by the topology.

23. A computer-controlled method, comprising:
a plurality of host machines each hosting at least one of a group of applications consisting of: a Customer Relationship Management (CRM) application, a Financial Management (FINS) application, a Human Capital Management (HCM) application, a Procurement and Sourcing (PRC) application, a Project and Portfolio Management (PRJ) application, and a Supply Chain Management (SCM) application;
a load balancer servicing each of the plurality of host machines;
a user-defined topology specifying interactions between the plurality of host machines, the load balancer, and a Real Application Clusters (RAC) database coupled with the plurality of host machines;
an identity management (IdM) host machine coupled with the plurality of host machines running an IdM suite to interact with at least one of the applications hosted by at least one of the plurality of host machines; and
the user-defined topology specifying interactions between the IdM host machine and the plurality of host machines.

24. The computer-controlled method of claim 23, further comprising the user-defined topology specifying interactions between the the IdM suite and an IdM database coupled with the IdM host machine.

25. The computer-controlled method of claim 23, further comprising the user-defined topology specifying interactions between the plurality of host machines and at least one database host coupled between the plurality of host machines and the RAC database.

26. The computer-controlled method of claim 23, wherein the topology comprises a plurality of building blocks, each building block specifying installation parameters for at least one of the applications.

* * * * *